(12) United States Patent
Biwersi et al.

(10) Patent No.: US 11,111,935 B2
(45) Date of Patent: Sep. 7, 2021

(54) CONTROL DEVICE

(71) Applicant: HYDAC SYSTEMS & SERVICES GMBH, Sulzbach (DE)

(72) Inventors: Sascha Alexander Biwersi, Mettlach (DE); Kai Sumpf, Schwalbach (DE); Stephan Peter Schmitt, Saarbruecken (DE)

(73) Assignee: HYDAC SYSTEMS & SERVICES GMBH, Sulzbach/Saar (DE)

( * ) Notice: Subject to any disclaimer, the term of this patent is extended or adjusted under 35 U.S.C. 154(b) by 104 days.

(21) Appl. No.: 16/489,738

(22) PCT Filed: Mar. 8, 2018

(86) PCT No.: PCT/EP2018/055830
§ 371 (c)(1),
(2) Date: Aug. 29, 2019

(87) PCT Pub. No.: WO2018/132677
PCT Pub. Date: Sep. 13, 2018

(65) Prior Publication Data
US 2020/0232483 A1  Jul. 23, 2020

(30) Foreign Application Priority Data

Mar. 10, 2017 (DE) .................... 10 2017 002 471.5

(51) Int. Cl.
*F15B 13/08* (2006.01)
*F16K 27/00* (2006.01)
(Continued)

(52) U.S. Cl.
CPC ...... *F15B 13/0817* (2013.01); *F15B 13/0857* (2013.01); *F15B 13/0867* (2013.01);
(Continued)

(58) Field of Classification Search
CPC .... Y10T 137/86493; Y10T 137/87885; H01R 9/2458; H01R 31/005; F15B 13/0817; F15B 13/0857; F15B 13/0867; F16K 27/003
See application file for complete search history.

(56) References Cited

U.S. PATENT DOCUMENTS

| 4,938,258 A | * | 7/1990 | Sato .................... H05K 7/14 137/269 |
| 5,522,431 A | * | 6/1996 | Bonacorsi .......... F15B 13/0817 137/596.16 |

(Continued)

FOREIGN PATENT DOCUMENTS

| DE | 10 2013 021 317 | 6/2015 |
| DE | 10 2016 011 860 | 4/2018 |

(Continued)

OTHER PUBLICATIONS

International Search Report (ISR) dated May 17, 2018 in International (PCT) Application No. PCT/EP2018/055830.

*Primary Examiner* — Seth W. Mackay-Smith
(74) *Attorney, Agent, or Firm* — Wenderoth, Lind & Ponack, L.L.P.

(57) ABSTRACT

A control device has a plurality of modular control sections (12a-12d), which form a control block when arranged beside one another and have units of an electromagnetically actuatable actuator system and/or of a sensor system for controlling or monitoring a valve apparatus, which are connected to a central energy supply and/or monitoring device, which have individual connection parts (20a-20d) assigned to the particular control section (12a-12d), and which are connected in series and to one another. At least some of the connection parts (20a-20d) used are wirelessly in direct engagement with one another by way of their plug parts (22a-22c) and socket parts (24a-24c) that face one another and are adjacent to one another.

12 Claims, 6 Drawing Sheets

(51) Int. Cl.
   *H01R 9/24*   (2006.01)
   *H01R 31/00*  (2006.01)

(52) U.S. Cl.
   CPC ......... *F16K 27/003* (2013.01); *H01R 9/2458* (2013.01); *H01R 31/005* (2013.01); *Y10T 137/86493* (2015.04); *Y10T 137/87885* (2015.04)

(56) References Cited

U.S. PATENT DOCUMENTS

| | | | | |
|---|---|---|---|---|
| 6,042,425 A * | 3/2000 | Moller | ................ | F15B 13/0817 439/281 |
| 6,164,335 A | 12/2000 | Hayashi | | |
| 6,192,938 B1 * | 2/2001 | Redemann | .............. | C23C 16/44 137/271 |
| 6,427,723 B2 * | 8/2002 | Bogdanowicz | ..... | F15B 13/0814 137/271 |
| 6,505,642 B2 * | 1/2003 | Miyazoe | ............. | F15B 13/0817 137/554 |
| 6,874,756 B2 * | 4/2005 | Hawkins | ............. | F15B 13/0817 137/553 |
| 7,191,800 B2 * | 3/2007 | Berner | ................ | F15B 13/0814 137/553 |
| 7,252,116 B2 * | 8/2007 | Miyazoe | ............. | F15B 13/0825 137/271 |
| 9,241,416 B2 * | 1/2016 | Berner | ................ | F15B 13/0839 |

FOREIGN PATENT DOCUMENTS

| | | |
|---|---|---|
| EP | 0 881 396 | 12/1998 |
| EP | 1 041 327 | 10/2000 |
| EP | 2 441 968 | 4/2012 |
| EP | 2 241 765 | 10/2013 |

\* cited by examiner

CONTROL DEVICE

FIELD OF THE INVENTION

The invention concerns a control device with a plurality of modular control sections. When arranged side-by-side, the control sections form a control block. The control sections are provided with units of an electromechanically operable actuator system and/or a sensor system for the control and monitoring respectively of a valve device, are connected to a central power supply and/or monitoring facility, and are provided with individual connector parts that are assigned to the respective control section and that are connected to each other in series.

BACKGROUND OF THE INVENTION

A control device of this kind for a valve device is known, for example, from EP 2 241 765 B1. Integrated into the known valve device is a recirculation valve section that is functionally associated with the control sections. The recirculation valve section is provided with an intelligent recirculation valve control unit. To be able to communicate, the intelligent recirculation valve control unit is connected via a communication connection with at least one control section to a communication bus cable. The communication bus cable and the communication connection comply with a CAN bus specification. The CAN bus is an extensively used industry standard and ensures compatibility and safeguarding of safety functions when using component combinations from different manufacturers. System maintenance and configuration is also simplified when using standardized components.

When connecting the individual control sections via a custom-made wiring harness or a series connection, also called "daisy chain" in the industry, the connection of different quantities of control sections or a subsequent extension of the control block with additional control sections causes significant additional expense. Moreover, the seals required for branches that come off wiring harnesses may be the source of weak points in an IP protection class test.

SUMMARY OF THE INVENTION

The invention is based upon the task of simplifying the wiring of individual control sections in a control block in such a way that control sections of different quantities may be connected to each other without difficulty, and that the number of control sections can also be subsequently expanded. Moreover, operational reliability is to be increased, and susceptibility to failure of a corresponding circuit is to be decreased.

These objects are basically met by a control device with the characteristics of the invention, as well as by a valve device with the characteristics of the invention.

A control device according to the invention is characterized in that at least part of the connector parts used are in direct wireless engagement with their adjacently located plug and socket parts that face each other. The individual connector parts are assembled into a daisy chain of the required number, and thus, form the interconnection between the individual control sections. Besides providing a simple way of expanding through plugging in of further connector parts, the added advantage is that, if one connector part is defective, it is simple and easy to remove and replace.

Depending on operating duration and application, the connector parts may be used again and assembled in new configurations. Typically, the control sections and the connector parts associated with the individual control sections exhibit the same design. Nevertheless, it is conceivable to select different control sections and/or different connector parts, for example with different shapes and dimensions, depending on requirements. Besides providing for an electrical connection, the interconnected plug and socket parts also provide for a solid mechanical attachment. The interconnection with the connector parts according to the invention may be used in any control device with multiple control sections for a valve device, as disclosed for example in the above-mentioned document EP 2 241 765 B1, in DE 10 2013 021 317 A1 and in the post published document DE 10 2016 011 860 A1.

In a preferred embodiment of the control device according to the invention, at least part of the connector parts used are T-shaped, with each other facing plug and socket parts and a contact part, which is arranged transverse and preferably vertical to the plug and socket parts, for connection to the respective control section. This arrangement has the advantage of providing a particularly compact arrangement of the individual connector parts and the interconnections in and between them. The assembled length of the plug and socket parts is expediently selected to match the width of the individual control sections that are arranged side-by-side. Through the plug and socket parts of the T-shaped connector parts that are connected to each other, a daisy chain is formed in a predetermined direction. From this group, which is interconnected and oriented in one direction, the individual contact parts branch off and form the connections to the respective control section.

It is particularly preferred if the contact parts are aligned perpendicular to the connection direction that is defined by plugs and sockets, and that all are of the same length. Nevertheless, it is also conceivable to select an orientation that differs from the 90° angle to that defined by the direction of plugs and sockets, as well as having different lengths of the individual contact parts, for example in the manner of steps with correspondingly arranged control sections.

In a further preferred embodiment of the control device according to the invention, the T-shaped connector parts that are joined to each other form, together with their joined plug and socket parts, a connector rail that extends transverse, preferably perpendicular, to the side-by-side arrangement of the control sections. The connector rail is connected to the contact parts, which are aligned in the direction of the control sections. Preferably, the group of individual parts is fastened through latching or screw connections in the direction of the connector rail and in the orientation of the contact parts attached to the respective control section. Depending on the installation orientation, the connector rail extends along the side-by-side arranged control sections. The contact parts are usually made to be rather short, which achieves a comparatively close attachment of the connector rail to the control block, which is formed by the control sections.

The latch or screw attachments effectively prevent an undesired detachment of the connector parts. This attachment not only secures the group of individual connector parts along the connector rail, but also the connection of the connector parts to the individual control sections. Additional position-fixing is achieved through sealing devices, which are disposed on the plug and/or socket part, as well as on the contact and/or control part in such a way that, when joining plug and socket or control section part and contact part respectively, the respective sealing device presses against both parts and prevents undesired ingress of contaminants at the respective connection section. The sealing devices are typically made from an elastomeric material and are disposed in a captive manner on the connector part or the control section part respectively.

Particularly preferred for position-fixing of the connector parts, which are attached to each other and/or are connected to the respective control section, are latching means, preferably in the form of at least one latching part, which engages with an associated counterpart on the other connector part or the respective control section part, respectively. The latching part is expediently made from an elastic material such as metal, plastic or a suitable compound material, and is preferably made in one piece with a housing part of the connector part or the control section part, respectively. Secure position-fixing is achieved by arranging multiple, preferably two or four, latching parts in each joining region in a preferably uniform arrangement, typically on opposite sides. The connector parts and control section parts are provided in their respective joining region with a rectangular, circular or elliptical cross-section. Nevertheless, arbitrary cross-sectional shapes that deviate from the above are also conceivable.

In a preferred embodiment of the invention the respective connector part and/or control section part is provided, in at least one joining region, with an enlargement compared to the cross-section of the connector part or control section part, and is provided in the enlarged part with a seat or a latching part with a catch pointing to the inside. A corresponding latching part is formed with a catch that points to the outside in the socket part, plug part, contact part or control section part that is associated with the joining region. The seat engages with the respective seat or the respective catch when pushing the plug and socket part or control section and contact part respectively together. Through the enlargement, which constitutes a housing part as such, the cross-section, which is predetermined by the parts that are assigned to the respective joining region, is enlarged to the extent so as to provide a corresponding installation space to house the latching means. Thus, the conductors inside the housing of the corresponding connector part or control section part respectively, which connect the plug, socket and contact parts to each other, are not affected by the arrangement and shape of the latching parts and their corresponding seats. In this instance the latching part is disposed and shaped on the inside of the enlargement. The corresponding seat is on the outside of the corresponding other part, or in reverse. The seat is disposed and shaped on the inside of the enlargement. The latching part is on the outside of the corresponding other part.

In a further preferred embodiment of the control device according to the invention one or more, preferably eight, plug elements in the plug part, socket elements in the socket part and contact elements in the contact part are shaped and disposed. The plug, socket and contact elements are interconnected to form the required circuit. The interconnections ensure the operating mode of the individual connector parts for the actuator system, sensor system, power supply and/or monitoring of the corresponding control section as operating elements in the control block. Standard plug, socket and contact parts as well as contact elements are expediently shaped on the connector part and on the control section part, with predetermined pin assignments and interconnections of the individual elements.

It is particularly preferred if the interconnection of the corresponding connector part provides a supply voltage, preferably via one or two plug elements and one or two socket elements. These elements are connected in pairs to each other as well as with a contact element, and/or an earth connection, preferably via one or two plug elements and one or two socket elements connected in pairs to each other as well as with a contact element, and/or an earth connection for sensors. Preferably, the connection is via one plug element and one socket element, which are connected in pairs to each other as well as with a contact element, and/or a CAN bus control connection, preferably via one or two plug elements and one or two socket elements, which are connected in pairs to each other as well as with a contact element, and/or an identifier, preferably via one plug element and one socket element, each of which is connected to a contact element, and/or a control voltage connection, preferably via one plug element or one socket element, which is connected to a contact element.

Due to the manifold interconnections, it is possible to connect the entire control section through a single connector part, which makes it possible to omit a complex wiring harness. The internal connection of the individual control sections is achieved through the interconnected connector parts. To be able to cope with high currents, the supply voltage and the earth connection are each preferably double in size. The earth connection for the sensors is to provide measurement security. The identifier is used to individually control the different control sections via the CAN bus control, in particular for determining their respective positions in the control block.

It is, furthermore, advantageous that the connector parts that are attached to each other may be connected via at least one connector plug to the central power supply and/or monitoring device. A connector plug is preferably provided at one end of the connector parts that are attached to each other. At the other end, connector parts that are attached to each other a terminating plug, is preferably provided with a terminating resistor for the CAN network. Thus, the entire control block requires only a single connector plug, which reduces cost and effort. The connector plug is connected to the free plug or socket part at the one end. The terminating plug is connected to the free plug or socket part at the other end. A connector part is usually provided with one socket part and one plug part. Nevertheless it is also conceivable to alternatingly arrange a connector part with two plug parts each and a connector part with two socket parts each one after the other along the daisy chain in the connector rail, if this is expedient for the required application.

The invention, moreover, concerns a valve device with a plurality of modular valve sections, which form a valve block in a side-by-side arrangement, with a control device according to the invention. At least one control section is assigned to each valve section. The valve sections may be controlled and monitored independently from each other via the control sections. The control block with the individual control sections is designed, application-dependent, for the valve device individually, and is arranged on the valve block. It is particularly preferred if a control section is assigned to each valve section, which results in a particularly compact design of the valve device.

In a preferred embodiment of the valve device according to the invention the control device extends parallel, preferably lateral, to the valve device and is attached to the same. Actuating facilities in particular are provided at the valve sections for the individual valves. The valve device, which may be used for different kinds of applications, is controlled, monitored and supplied with power by a control device. The actuating facilities are, for example, control levers that may be manipulated by an operator.

The above described and the following characteristics may be implemented individually or in arbitrary combinations on a control device according to the invention or a valve device according to the invention. Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are purely schematic and not to scale.

DETAILED DESCRIPTION OF THE INVENTION

Figure 1:
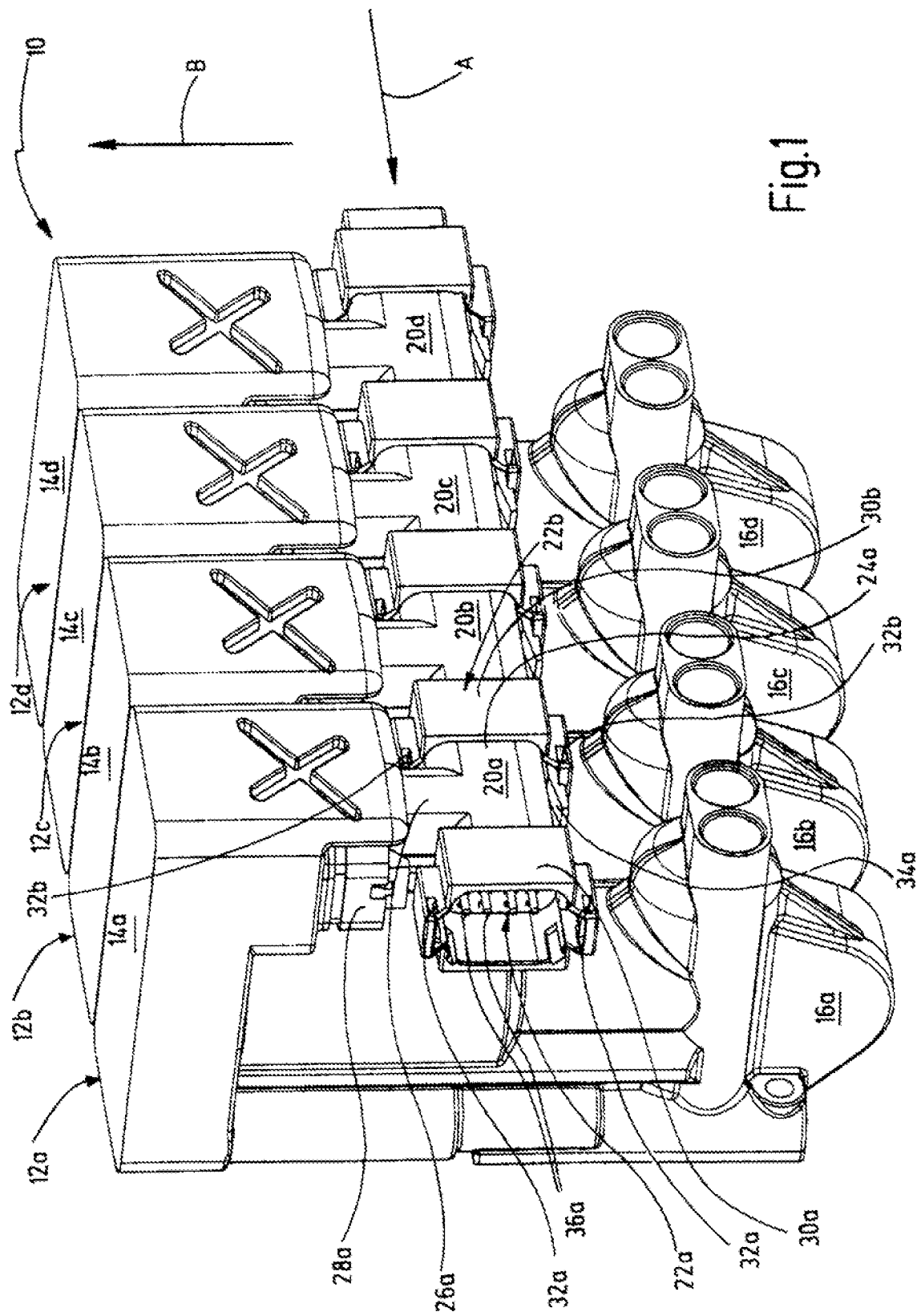
FIG. 1 is a perspective view of a control device according to an exemplary embodiment of the invention, comprising a plurality of control sections with connector parts attached thereto.

FIG. 1 depicts in perspective view a control device 10 with four control sections 12a, 12b, 12c, 12d, which are arranged side-by-side and form a control block. It is of course evident that control sections 12a to 12d can be arranged side-by-side in any required number. In the exemplary embodiment shown, the control sections 12a to 12d are all of the same design with a first housing part 14a to 14d, which in the depiction of FIG. 1 is shown at the top, and a second housing part 16a to 16d, which in the depiction of FIG. 1 is shown at the bottom, which comprise units of an electromagnetically operable actuator system and/or a sensor system.

Each of the control sections 12a to 12d, which is assembled from a respective first housing part 14a to 14d and a respective second housing part 16a to 16d, has a U-shaped design. The U-shape defines the installation space. Disposed in the installation space are the connector parts 20a to 20d, each of which is attached with its upper end to the first housing part 14a to 14d of a control section 12a to 12d. The lower end of each connector part is free and unattached. The connector parts 22a to 22d are designed in a T-shape, comprising a plug part 22a, a socket part 24a and a contact part 26a. Via the plug parts 22a and the socket parts 24a, the connector parts 20a to 20d are directly engaged with each other and form a daisy chain along a direction A.

Each of the connector parts 20a to 20d is connected to a control section part 28a of a control section 12a to 12d via the contact parts 26a and is detachably joined to the same.

The control sections 12a to 12d are aligned in a further direction B, which extends vertical to direction A. Accordingly, the connection via the contact parts 26a of the individual connector parts 20a to 20d at the respective control section part 28a is aligned along the further direction B. It is evident that the two directions A, B may be aligned at an angle to each other that differs from 90°.

The plug parts 22a, 22b, the socket parts 24a and the contact parts 26a of the individual connector parts 20a to 20d each have an essentially rectangular cross-section. The plug part 22a, 22b is provided with an enlargement 30a, 30b that has an increased cross-section compared to the plug part 22a, 22b. Formed onto the enlargements 30a, 30b each are two seats 32a, 32b that point towards the inside and which are disposed on two opposing inner sides, shown in the representation of FIG. 1 top and bottom, of the enlargement 30a, 30b. The seats 32a, 32b serve as a clip connection with a latching part 34a of the next connector part 20a, as is shown in the clip connection of the first latching part 34a of the first connector part 20a with the second seat 32b, which is formed in the enlargement 30b of the second connector part 20b.

Figure 2:
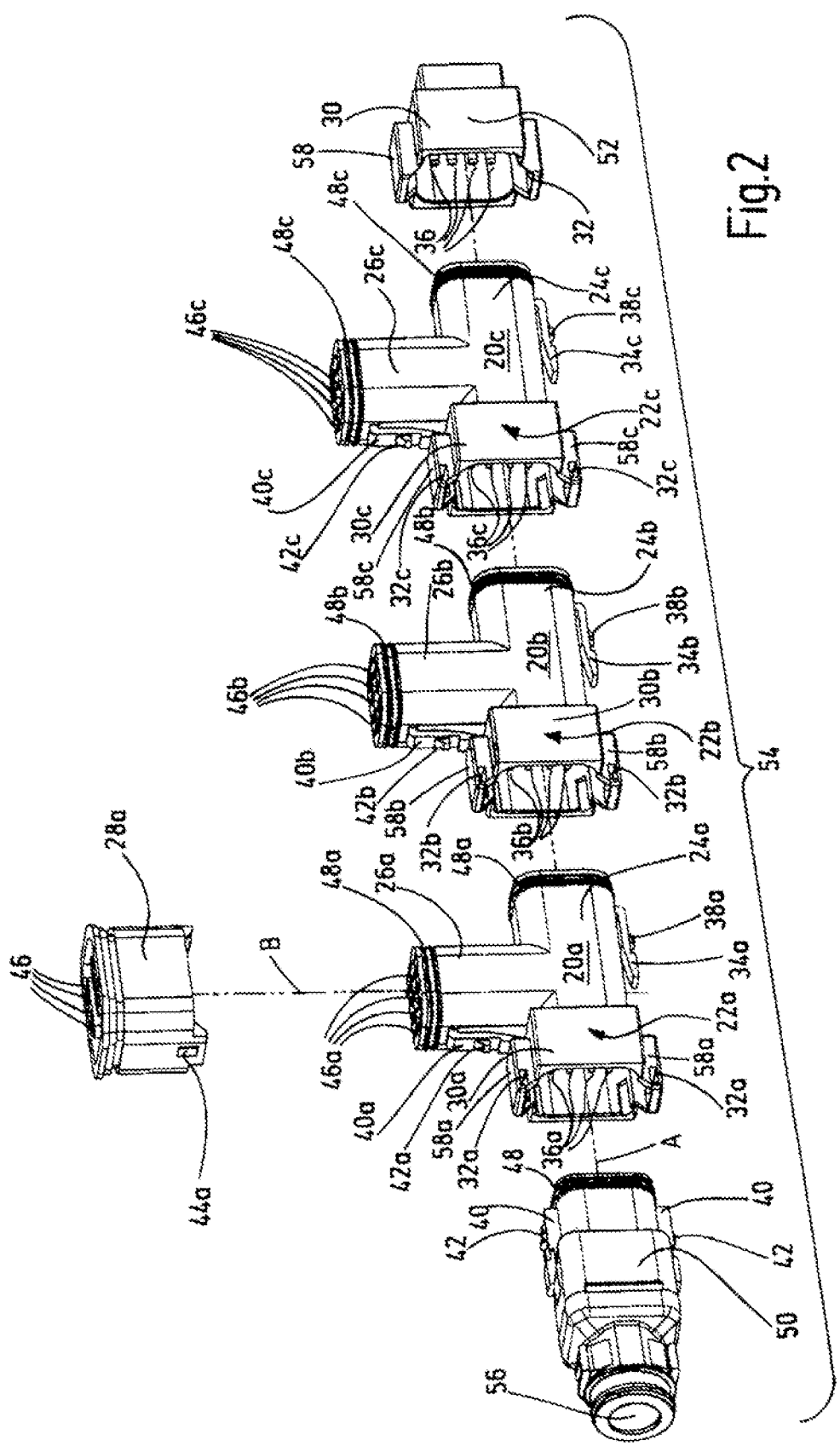
FIG. 2 is an exploded perspective view of the connector parts of FIG. 1 with a connector plug and a terminating plug to form a connector rail, as well as a control section part to provide a connection to a corresponding control section.

FIG. 2 depicts in perspective three connector parts 20a, 20b, 20c, the control section part 28a as well as a connector plug 50 and a terminating plug 52. The individual components are represented separately from each other, but correspond to their arrangement in a later installation position to each other. The connecting plug 50, the connector parts 20a to 20c and the terminating plug 52 form a connector rail 54 that extends along the direction A. The control section part 28a may be connected along the further direction B to the first connector part 20a.

Arranged on the plug parts 22a to 22c are eight plug elements 36a to 36c each in two rows adjacent to each other, although only four plug elements 36a to 36c are visible on each respective plug part 22a to 22c in the illustration of FIG. 2. The socket elements formed in the socket parts 24a to 24c are obscured. To connect the socket elements of the socket part 24c of the third connector part 20c, plug elements 36 are provided on the terminating plug 52. Correspondingly, socket elements that are obscured in the connector plug 50 in the illustration of FIG. 2 are provided for connecting the plug elements 36a on the plug part 22a of the first connector part 20a.

Eight contact elements 46, 46a to 46c each are disposed in two rows at the upper ends of the connector parts 20a to 20c and the control section part 28a. A resistor (not shown) is disposed in the terminating plug 52 for a CAN network. The connector plug 50 is provided with a connection opening 56 to which a corresponding cable for the supply of the connector rail 54 may be connected. The connector rail 54 serves not only to provide power, but also to transmit data of the directional control valve operation of an electrohydraulic valve in a respective control section 12a to 12d (cf. FIG. 1).

To secure the mechanical attachment between the connector parts 20a to 20c as well as with the connector plug 50, the terminating plug 52 and the control section part 28a, clip connections are provided along both directions A and B. Each of the connector parts 20a to 20c is provided on the plug part 22a to 22c as well as on the terminating plug 52, with an enlargement 30, 30a to 30c compared to the cross-sectional shape defined by the respective part. Each enlargement 30, 30a to 30c is shaped in the likeness of a hollow profile section with enlargement parts 58, 58a to 58c, each of which is provided with a seat 32, 32a to 32c that faces to the inside. In a comparable manner the housing of the control section part 28a is enlarged compared to the cross-section of the associated contact part 48a of the first connector part 20a and is provided with further seats 44a.

The latching part that corresponds to the respective seat 30, 30a to 30c, 44a is formed on the respective other part of the joining region, that is, latching parts 34a to 34c at the socket parts 24a to 24c of the connector parts 20a to 20c as well as further latching parts 40, 40a to 40c at the connector plug 50 as well as on the contact parts 26a to 26c of the connector parts 20a to 20c. In the illustration of FIG. 2 the latching parts that are formed on the second, upper side of the socket parts 24a to 24c are missing. The latching parts 34a to 34c, 40, 40a to 40c are made to be elastic and are pivoted with one end on the corresponding part. Each latching part is provided with a catch 38a to 38c and a further catch 42, 42a to 42c respectively.

Depending on the application of the control device 10 (cf. FIG. 1), the housings of the individual components 20a to 20d, 50, 52 as well as the control sections 12a to 12d (cf. FIG. 1) and the control section parts 28a are made from plastic, metal and/or a suitable compound material. In the end section of the contact parts 26a to 26c, the socket parts 24a to 24c as well as the connector plug 50, which are assigned to the respective joining region, a sealing device 48a, 48b, 48c is disposed, which is made from an elastomeric material and has two parallel extending sealing beads. The connecting parts 20a to 20d shown in the exemplary embodiment of FIGS. 1 and 2 are all of the same design. Nevertheless, different designs and combinations of connector parts of different kinds along the connector rail 54 are conceivable.

Figure 3:
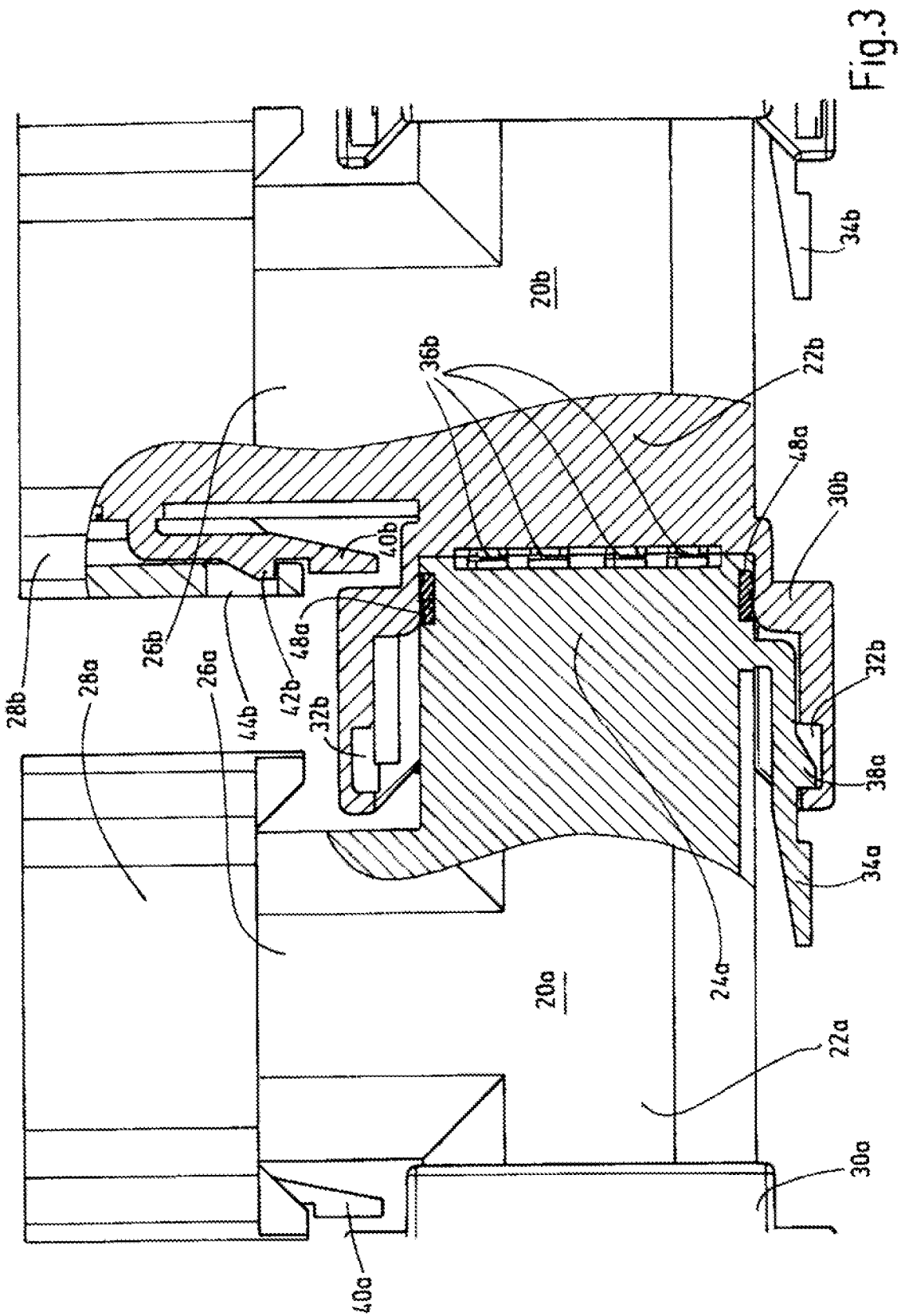
FIG. 3 is an enlarged side view in section illustrating the joining of two connector parts to each other and to a control section part each of FIG. 1.

In cross-section and enlarged, FIG. 3 depicts the joining region between the first connector part 20a and the second connector part 20b. At the contact area between the socket part 24a and the plug part 22b, the plug elements 36b are inserted into socket elements (not shown in detail) of the socket part 24a. The cross-section of FIG. 3 depicts one of the two rows comprising four plug elements 36b each. The seal 48a is inserted into a circumferential groove in the socket part 24a and is pressed with both its sealing beads against plug part 22b. The enlargement 30b adjoins the section of the plug part 22b where the seal 48a makes contact. The enlargement 30b encompasses the latching part 34a, formed on the socket part 24a, in such a way that the catch 38a, which is formed on the latching part 34a, engages with the seat 32b, which is formed in the enlargement 30b, and thus, fixes the position of the two connector parts 20a, 20b to each other.

To release the bond of the two connector parts 20a, 20b, the latching part 34a is moved towards the socket part 24a, which moves the catch 38a out of the seat 32b, so that both connector parts 20a, 20b can be separated and released from each other again. In providing comparable latch attachments, FIG. 3 depicts the enlargement 30a on plug part 22a and the latching part 34b on connector part 20. The T-shaped connector parts 20a, 20b are attached via their contact parts 26a, 26b to the control section parts 28a, 28b of the control sections 12a to 12d (cf. FIG. 1), where a corresponding latch attachment is provided.

In contrast to the horizontally oriented latching parts 34a, 34b depicted in FIG. 3, the further latching parts 40a, 40b, formed on contact parts 26a, 26b, are oriented vertically and are pivoted with their upper end at the respective contact part 26a, 26b. The outward-directed further catch 42b engages with a further seat 44b, which is formed on the control section part 28b. The latched attachment may be released in that the further latching part 40b is moved in the direction of the contact part 26b and the control section part 28b is separated from the connector part 20b.

Figure 4B:
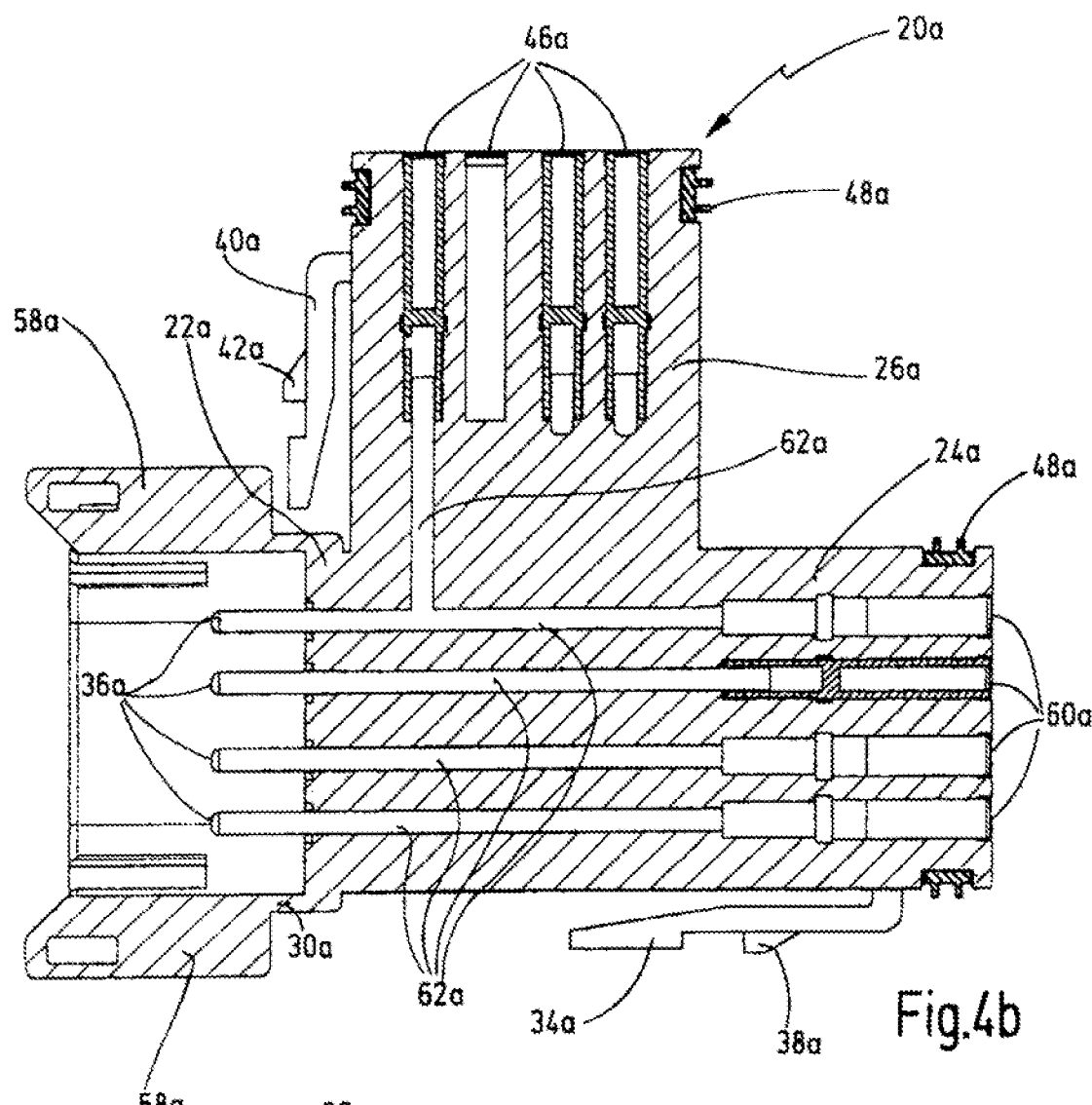
FIG. 4b is a side view in section through the connector part shown in FIG. 4a along line A-A to illustrate the interconnection inside the connector part.
Figure 4A:
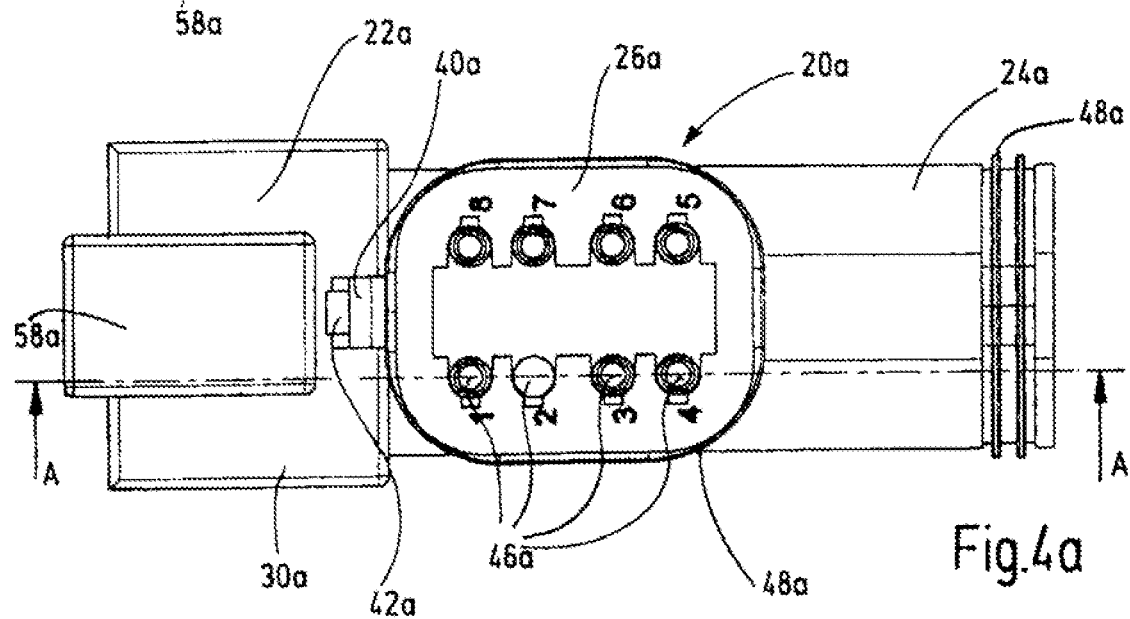
FIG. 4a is a top plan view of connector part of FIGS. 1 and 2.

From the plan view of FIG. 4a, it becomes apparent that the connector part 20a is comprised of the plug part 22a with the enlargement 30a and the enlargement part 58a, the socket part 24a with a seal 48a and the contact part 26a with the further latching part 40a and the further catch 42a as well as the seal 48a. The joining surface of the contact part 26a, which has a rectangular cross-section with rounded corners, is provided with eight contact elements 46a, which are arranged in two rows with four contact elements 46a each. The depiction of FIG. 4a shows the individual contact elements 46a with consecutive numbers.

It is apparent from the cross-section in FIG. 4b taken along the line A-A in FIG. 4a that the connector part 20a is block-shaped. The plug elements 36a, the contact elements 46a and the socket elements 60a are connected to each other through respective conductors 62a and are interconnected as required (cf. FIG. 5). Moreover, the enlargement parts 58a on the enlargement 30a, the seal 48a on contact part 26a and on the socket part 24a as well as the two latching parts 34a, 40a, each with outward-oriented catches 38a, 42a, are clearly recognizable in the depiction of FIG. 4b.

Figure 5:
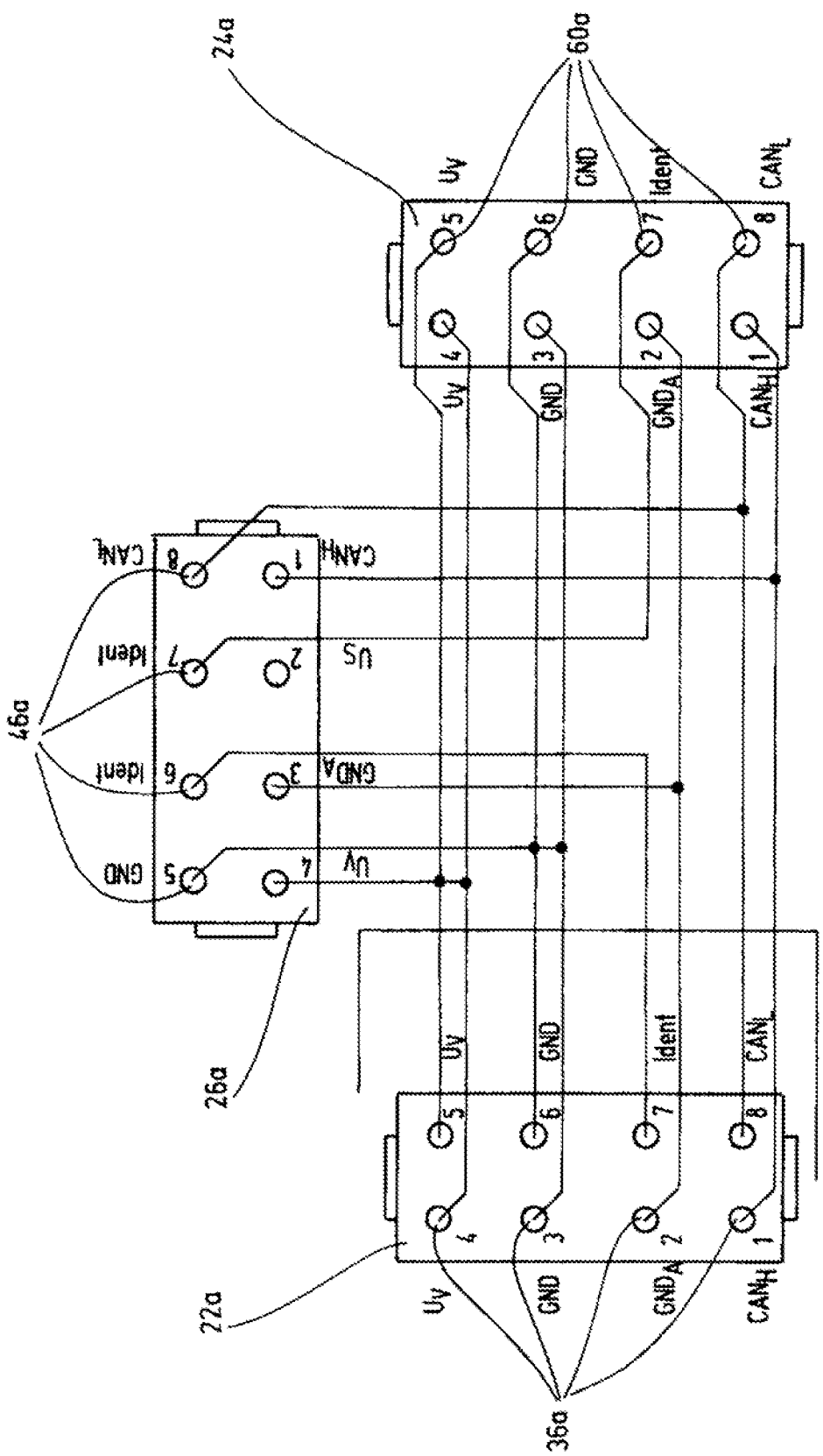
FIG. 5 is a circuit diagram for the interconnections in the respective connector part according to the exemplary embodiment of the invention.

The circuit diagram in FIG. 5 shows how the eight plug elements 36a, arranged on plug part 22a, are connected with the eight contact elements 46a, formed on contact part 26a, and the eight socket elements 60a formed on socket part 24a. The plug parts 26a, the socket parts 60a and the contact elements 46a, which are designated with the numbers 1 through 8 are interconnected and form a CAN bus control circuit comprised of a $CAN_H$ connection at number 1 and a CANS connection at number 8. The plug parts 36a and the socket elements 60a, which are designated with the number 2, are connected to the contact element 46a with the number 3, forming the earth connection $GND_A$ for a sensor system. The contact element 46a designated with the number 2 is not used in the circuit diagram of FIG. 5, but it may be used as a connection for a control voltage Us (not shown). "H" is the abbreviation for "High" and "L" for "Low".

The plug elements 36a and the socket elements 60a designated with the number 7 are connected independently from each other to the contact elements 46a designated with the numbers 6 and 7. Each forms an identifier Ident for the position detection of the individual control sections 12a to 12d (cf. FIG. 1) in the valve block. The plug elements 36a and the socket elements 60a designated with the number 3 and 6 are connected together via a common conductor with the contact element 46a designated with the number 5 and form a double earth connection GND. In a comparable manner the plug elements 36a and the socket elements 60a designated with the numbers 4 and 5 are connected together via a common conductor with the contact element 46a designated with the number 4 and form a double power supply connection $U_V$.

It is evident that the plug elements 36a, the socket elements 60a and the contact elements 46a may be formed and arranged in a number other than eight on the respective part 22a, 26a and 24a. The interconnections can be made as required and may differ from the circuit diagram shown in FIG. 5.

Figure 6:
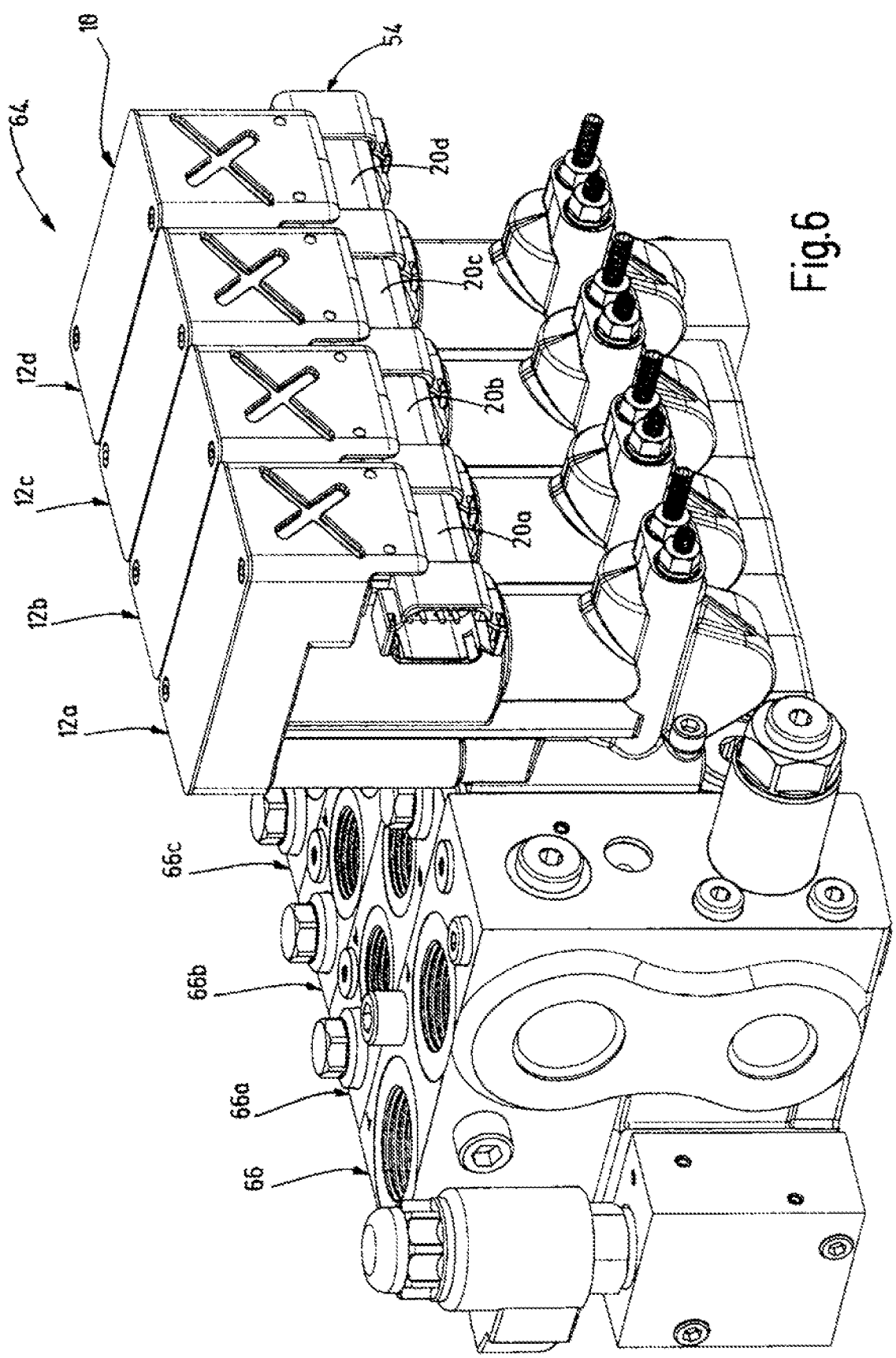
FIG. 6 is a perspective view of a valve device according to an exemplary embodiment of the invention with a control device attached thereto.

FIG. 6 shows in perspective view a valve device 64 with a total of five valve sections 66, 66a, 66b, 66c, one of which is obscured in the representation of FIG. 6. The valve sections 66, 66a-66c define with their cuboid shape the space required for individual valves and form overall in a side-by-side arrangement a valve block. A control device 10, comparable to that depicted in FIG. 1, is provided for the control and monitoring of the valve device 64 and is disposed on the side of the valve block. One control section 12*a* to 12*d* is assigned and individually connected to each valve section 66*a*-66*c*. A further valve section 66, which is arranged in the representation of FIG. 6 on the left, adjacent to the first valve section 66*a*, is shown without separate control section. It is conceivable to arrange an additional control section to the left of the first control section 12*a* and to attach it to the first control section 12*a* and to connect it to the further valve section 66.

The valve sections 66, 66*a*-66*c* of the valve device 64 can be individually controlled and monitored via the connector rail 54, which is formed by the individual connector parts 20*a* to 20*d*. To this end the individual control sections 12*a* to 12*d* are provided with an electromagnetically operable actuator system and/or sensor system (not shown). The individual valve sections 66, 66*a*-66*c* of the valve block and the individual control sections 12*a* to 12*d* of the control block of the control device 10 may be individually manufactured, stored and/or sold. The modular design of the valve device 64 with the control device 10 makes it possible to assemble individual and application-specific designs of the valve block of the valve device 64 for different industrial applications.

While one embodiment has been chosen to illustrate the invention, it will be understood by those skilled in the art that various changes and modifications can be made therein without departing from the scope of the invention as defined in the claims.

The invention claimed is:

1. A control device, comprising:
a plurality of modular control sections being in a side-by-side arrangement and forming a control block, each of the modular control sections having at least one of an electromechanically operable actuator system or a sensor for controlling and monitoring a respective valve and being connectable to a central power supply or monitoring facility;
individual connector parts coupled to the respective modular control sections, each of the connector parts coupled to a different one of the modular control sections in direct wireless engagement via a plug part, a socket part and a contact part of each of the connector parts, the connector parts being adjacent and facing one another forming a connector rail, each of the connector parts being T-shaped with the plug part, the socket part and contact part of each of the connector parts forming the T-shape, each of the contact parts being arranged at an angle to the respective plug part and socket part of each of the connector parts, each of the contact parts being connected to a respective one of the control sections, the connector rail being at an angle to the side-by-side arrangement of the control sections; the plug parts, the socket parts and the contact parts having substantially rectangular cross sections; and
an enlargement on each of the plug parts with an enlarged cross section compared to the socket parts, each of the enlargements having two seats directed toward an inside and on opposite inner sides of each of the enlargements.

2. A control device according to claim 1 wherein the contact parts are transverse to the plug parts and socket parts.

3. A control device according to claim 2 wherein the contact parts extend vertically; and the plug parts and the socket parts extend horizontally.

4. A control device according to claim 1 wherein latches on the socket parts releasably engage the respective seats on the plug parts releasably fastening the respective plug part to the respective socket part.

5. A control device according to claim 4 wherein mating latches on the contact parts and on the control sections releasably fasten the contact parts to the respective control sections.

6. A control device according to claim 1 wherein an enlargement is on each of the control sections with an enlarged cross section compared to the contact parts, each of the enlargements on the control sections has two seats directed toward an inside and on opposite sides of the respective enlargement on the respective control section; and
latches on each of the control parts and each of the socket parts have catches pointing towards outsides of the control parts and the socket parts releasably engaging the respective seats, releasably fastening the control sections and the connector parts by pushing the plug parts and the socket part together and pushing the control sections and the contact parts together.

7. A control device according to claim 1 wherein each of the plug parts has at least one electrical plug element therein;
each of the socket parts has at least one electrical socket element therein; and
each of the control parts has at least one electrical socket element therein, the respective plug element, the respective socket element and the respective contact element being interconnected.

8. A control device according to claim 1 wherein each of the plug parts has multiple electrical plug elements therein;
each of the socket parts has multiple electrical socket elements therein; and
each of the control parts has multiple electrical control elements therein, the respective plug elements, socket elements and control elements being interconnected.

9. A control device according to claim 8 wherein interconnections of the respective electrical plug elements, the electrical socket elements and the electrical control elements provide at least one of a supply voltage connection, an earth connection, an earth connector for sensors, a CAN bus control connection, an identifier or a control voltage connection.

10. A control device according to claim 1 wherein a plug connector is coupled to a first end one of the connector parts that are connected to one another, the plug connector being connectable to at least one of a central power supply or monitoring device; and
a terminating plug is connected to a second end one of the connector parts that are connected to one another and has a terminating resistor for a CAN network, the first and second end ones of the connector parts being at opposite ends of the connector rail.

11. A valve device, comprising:
a plurality of valves forming a valve block and being electromechanically operable; and
a control device including
a plurality of modular control sections being in a side-by-side arrangement and forming a control block, each of the modular control sections connected to, controlling and monitoring a respective valve of the plurality of valves and being connectable to a central power supply or monitoring facility;

individual connector parts coupled to respective modular control sections, each of the connector parts coupled to a different one of the connector parts in direct wireless engagement via a plug, a socket part and a contact part of each of the connector parts, the connector parts being adjacent and facing one another forming a connector rail, each of the connector parts being T-shaped with the plug part, the socket part and contact part of each of the connector parts forming the T-shaped, each of the contact parts being arranged at an angle to the respective plug part and socket part of each of the connector parts connected to a respective one of the modular control sections, the connector rail being at an angle to the side-by-side arrangement of the control sections; the plug parts, the socket parts and the contact parts having substantially rectangular cross sections; and an enlargement on each of the plug parts with an enlarged cross section compared to the socket parts, each of the enlargements having two seats directed toward an inside and on opposite inner sides of each of the enlargements.

12. A valve device according to claim 11 wherein the control device extends parallel to the valves.

* * * * *